March 27, 1956 S. H. EDGE ET AL 2,739,671
LUBRICATING DEVICES
Filed Feb. 10, 1954 2 Sheets-Sheet 1
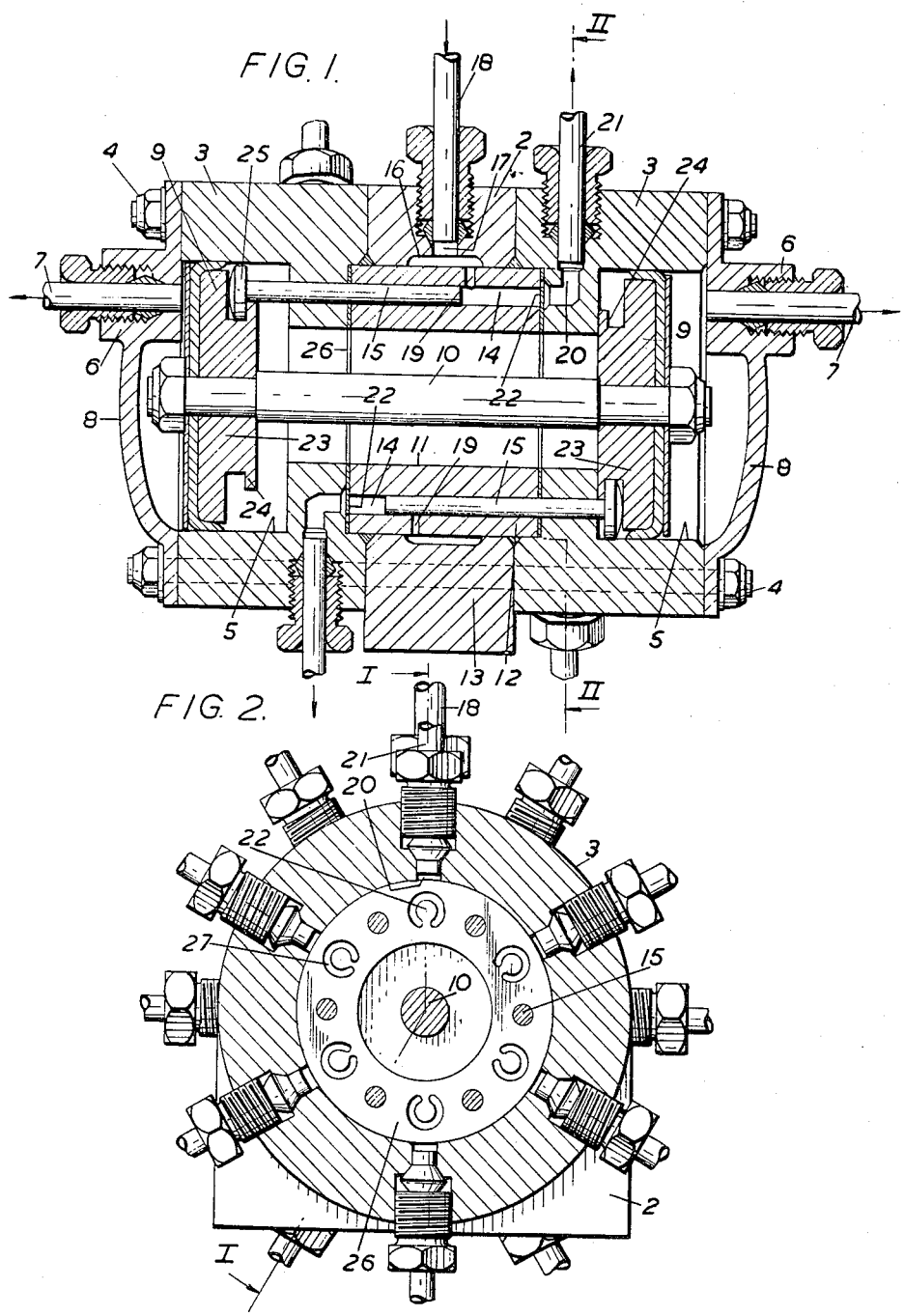

March 27, 1956  S. H. EDGE ET AL  2,739,671
LUBRICATING DEVICES
Filed Feb. 10, 1954
2 Sheets-Sheet 2
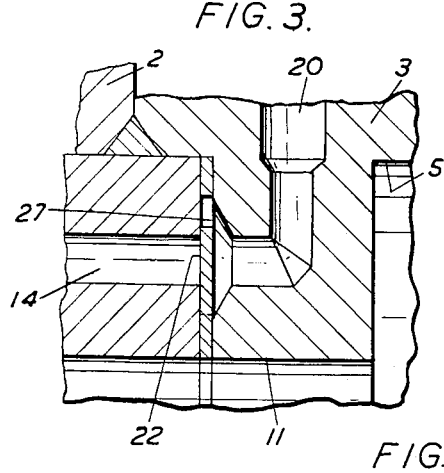
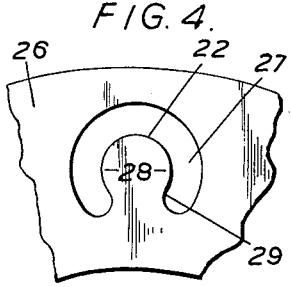
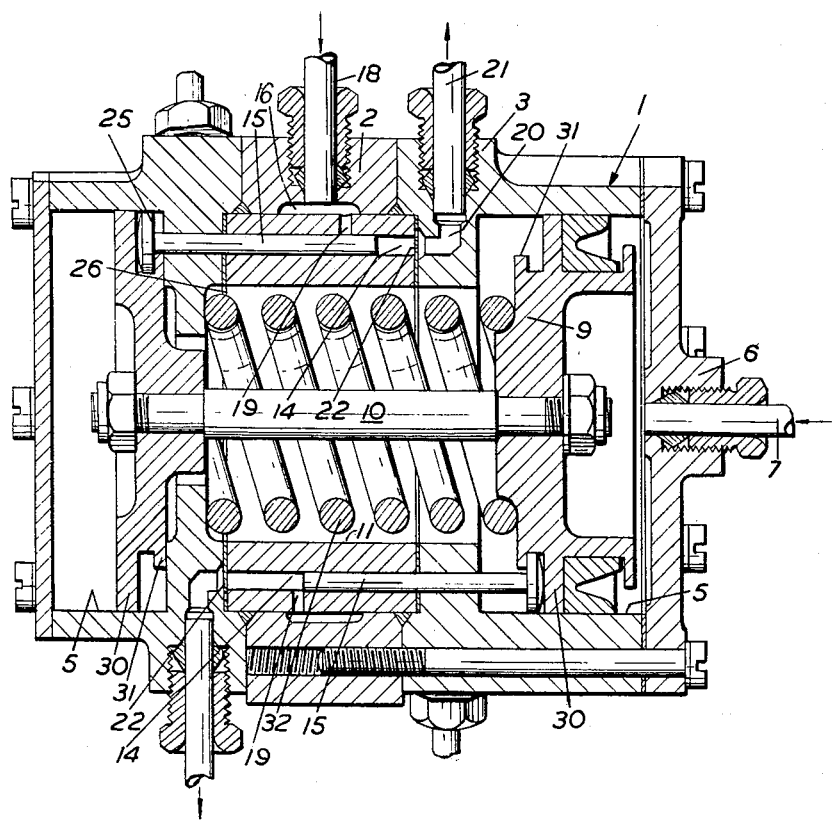
Inventors
Stanley Howard Edge
Dennis Albert Sams
By
Attorneys

2,739,671

LUBRICATING DEVICES

Stanley Howard Edge and Dennis Albert Sams, Lincoln, England, assignors to Clayton Dewandre Company Limited, Lincoln, England, a British company Application February 10, 1954, Serial No. 409,414

Claims priority, application Great Britain February 12, 1953

9 Claims. (Cl. 184—29)

This invention relates to lubricating devices and more particularly to such devices of the kind wherein a pumping mechanism is arranged for operation at regular or irregular intervals to cause periodic distribution of lubricant from a reservoir to a number of points on a machine, vehicle or the like.

The object of the present invention is to provide an improved and simplified lubricating device of the kind described which is small, compact, and of light weight, being designed particularly for use on motor cars and other light vehicles.

According to the invention a lubricating device of the kind described includes a casing having an inlet adapted to be connected with a reservoir or like means for containing a supply of lubricant and two series of outlets adapted to be connected with the points requiring lubrication, two series of plungers reciprocably mounted in two series of bores in said casing which are adapted to receive lubricant from said inlet and each of which series communicates with one of the series of outlets, and means mounted in said casing which are alternately movable in reverse directions and which are operable, when moved in one or the other of said directions, to advance one series of plungers so as to discharge lubricant from the bores in which that series of plungers is mounted, and simultaneously to retract the other series of plungers so as to induce fresh lubricant into the bores in which said other series of plungers is mounted.

Reference will now be made to the accompanying drawings in which:

Fig. 1 is a sectional elevation of one embodiment of the invention taken on the line I—I of Fig. 2, Fig. 2 is a section taken on the line II—II of Fig. 1, Fig. 3 is an enlarged fragmentary view of part of Fig. 1, Fig. 4 is an enlarged fragmentary view of part of Fig. 2, and Fig. 5 is a sectional elevation of another embodiment of the invention.

The embodiment illustrated in Figs. 1 to 4 includes a substantially cylindrical casing 1 which is constructed in three main parts, namely a central part 2 and two end parts 3. The three parts are held rigidly together by bolts 4. In each of the end parts there is formed a cylinder 5, the two cylinders being co-axial and having communication at their outer ends with a source of vacuum (not shown) through ports 6 and pipes 7. When the lubricator is used on a vehicle, the induction manifold of the engine may provide the source of vacuum. The outer ends of the cylinders are closed by detachable cover-plates 8 in which the ports 6 are formed, and within each of the cylinders a piston 9 is slidably mounted, the two pistons being rigidly interconnected by a rod 10 which passes freely through a bore 11 extending centrally through the three parts of the casing.

The central part 2 of the casing is formed in two concentric portions 12 and 13, the inner portion 12 fitting closely within the outer portion 13, and in the inner portion there is formed a number of bores 14 from which lubricant is discharged by plungers 15 as will be described later herein. The bores are arranged in a circle concentric with the inner portion of the central part of the casing and extend from end to end thereof. The axes of the bores are parallel to the axis of said inner portion of the central part of the casing, which axis lies on the common axis of the two pistons. The bores are divided into two series which are distinguished from one another by the fact that the bores of one series discharge from the opposite end to those of the other series. For the sake of convenience the bores of one series are disposed alternately with those of the other series in the circle in which they are all arranged.

In the inner surface of the outer portion 13 of the central part of the casing there is formed a circumferential groove 16 into which opens an inlet port 17 formed in said outer portion. This port is connected by a conduit 18 with a lubricant reservoir (not shown) from which the lubricant is fed by gravity through said inlet port into the groove 16. The latter is in communication with the bores of both series by means of a number of orifices 19 formed in the inner portion of the central part of the casing. Each orifice opens into its respective bore intermediate the ends thereof but slightly nearer the discharge end.

In each end part of the casing there is formed a series of outlet passages 20 which extend radially through the casing to the exterior thereof. To the outer end of each passage there is connected a delivery conduit 21 leading to one of the points requiring periodical lubrication. A series of these conduits is provided for each series of radial passages. At their inner ends the passages turn through 90 degrees so as to coincide with the discharge ends of the bores, and the arrangement is such that the discharge ends of one series of bores open into the inner ends of one series of radial passages, and the discharge ends of the other series of bores open into the inner ends of the other series of radial passages. Communication between the discharge ends of the bores and the inner ends of the radial passages is controlled by non-return valves 22 which will be described later herein.

The end of each bore remote from the discharge end is extended through the adjacent end part of the casing into one or the other of the cylinders. The plungers 15, which are slidably mounted in the bores, are divided into two series, one for each series of bores, and the heads of one series are connected to one of the pistons 9 whilst the heads of the other series are connected to the other piston. This connection can conveniently be effected by forming each piston with a portion 23 of reduced diameter on which a flange 24 is provided for engagement by the enlarged heads 25 of the corresponding series of plungers.

The non-return valves 22, of which there is one for each bore, are constructed in the form of flap-valves which are interposed one between the discharge end of each of the bores and the inner end of the radial passage associated therewith. The valves are thus divided into two circular series, and each series is formed in a thin metal annulus 26 clamped between one of the end faces of the inner portion 12 of the central part of the casing and the inner end face of the adjacent end part of the casing. Each flap-valve is constructed by cutting in the respective annulus an arcuate slot 27 extending over the greater part of a circle so as to leave bounded by the slot a disc-shaped portion 28 (Fig. 4) which is joined by a neck portion 29 to the main part of the annulus. Each of these disc-shaped portions thus constitutes a flap-valve which covers the discharge end of the bore that it is adapted to control, and which seats against the adjacent end face of the inner portion of the cental part of the casing. The valves thus permit lubricant to flow from the bores into the radial passages but prevent flow in the reverse direction, and their construction is such that they possess an inherent resilience which biasses them towards their seated positions, so that any necessity for return springs is thereby entirely eliminated. The annuli 26 in which the valves are formed also act as seals between the end faces of the central part of the casing and the inner end faces of the end parts of the casing, thereby preventing any loss of pressure at those points.

The operation of the lubricant distributing device described above is as follows:

Assuming that one of the pistons 9 has been previously advanced to the inner limit of its stroke, and the other piston therefore retracted to the outer limit of its stroke, each of the plungers 15 connected to the advanced piston will be in an advanced position within its bore and the plungers connected to the retracted piston will be in retracted positions. The bores within which the latter plungers are mounted will therefore each contain a quantity of lubricant between the end of the plunger and the corresponding flap-valve, the lubricant having entered the bores from the reservoir by way of the conduit 18, inlet port 17, groove 16 and orifices 19. When vacuum is applied to the cylinder within which the advanced piston is mounted, this piston is retracted to the outer limit of its stroke and causes the other piston to be simultaneously advanced to the inner limit of its stroke. During this operation the plungers connected to the advancing piston, which plungers were previously in their retracted positions, are advanced within their bores, firstly to close off the inlet orifices 19 and thereafter to expel the charges of lubricant past the flap-valves into the radial passages 20 associated with those bores and thence through the corresponding delivery conduits 21 to the points to which those conduits are connected. Meanwhile, the plungers which are connected to the retracting piston, which plungers were previously in their advanced positions, are retracted within their bores simultaneously with the advance of the other series of plungers, and each induces a fresh charge of lubricant into its bore through the respective inlet orifice 19 in preparation for the next actuation of the lubricator when the above operations will be reversed; that is to say, the piston and plungers which have been advanced during this operation will be retracted during the next and vice versa. This reversal of operations, which occurs alternately as the lubricator is actuated, is effected by means of a change-over valve (not shown) interposed in the pipes 7 and operable, at one operation, simultaneously to place one of the cylinders 5 in communication with the source of vacuum and the other in communication with atmosphere so that the pistons are moved in one direction, and, at the next operation, simultaneously to reverse these communications so that the pistons are moved in the opposite direction.

Through the provision of the non-return flap valves, should any blockage occur in any of the delivery conduits 21, or if the discharged lubricant meets with any resistance at the point to which it is being delivered, each successive stroke of the plunger discharging to that point will increase the pressure in the conduit until the blockage is cleared or the resistance overcome.

The quantity of lubricant which is delivered to any one point can be varied simply by replacing the plunger which discharges the lubricant to that point by one of a different length, the quantity discharged by any one plunger being equal to the volume of that portion of the plunger which lies between the respective inlet orifice 19 and the end of the plunger when it is fully advanced.

The lubricator described above can also be operated by compressed air, and its operation can be controlled in a number of ways. For example, when applied to the lubrication of an automobile vehicle, the compressed air or vacuum necessary for operating the lubricator can be applied by depression of the brake-pedal. In the case of an air-pressure braking system the connection to one of the brake-cylinders can have a branch to the cylinders of the lubricator. In a vacuum braking system, the vacuum servo-device can be connected to the cylinders of the lubricator. In other applications of the invention an automatically operated change-over valve is interposed between the source of compressed air or vacuum and the cylinders of the lubricator, the valve being so arranged that it opens to enable a pressure impulse to be transmitted to the cylinders alternately at regular predetermined intervals. Thus all points requiring lubrication receive it periodically instead of at the irregular intervals of brake-pedal operation.

In the embodiment illustrated in Fig. 5 only one fluid-pressure or vacuum operated piston is used, the other being replaced by a circular and substantially plate shaped member 30 formed with a flanged portion 31 for engagement by one of the series of plungers. The member 30 performs the function of and operates in a manner similar to the piston which it replaces, except that it is not acted upon by vacuum or fluid pressure. The member 30 and the piston 9 operate in tandem similarly to the pair of pistons described earlier herein, but, whilst they are moved in one direction by air-pressure or vacuum acting on one side of the piston, they are moved in the reverse direction by a return spring 32. As a result, lubricant is discharged by both series of plungers, the two series operating successively, at each actuation of the lubricator. In all other respects the construction and operation of this embodiment of the invention are the same as those of the lubricator described earlier herein, and, for the sake of convenience, similar parts in the two embodiments have been given the same reference numerals.

By modifying the pistons slightly the lubricator of the present invention can also be operated by hydraulic pressure.

We claim:

1. A lubricating device of the kind having a source of lubricant supply and lubricant distributing means, comprising a casing having a main inlet for connection to the source of lubricant supply and two series of outlets for connection to points requiring lubrication, two series of bores in the casing, the bores of each series being arranged parallel to one another in a circle and communicating with one of the series of outlets, and each bore having an inlet communicating with said main inlet, two series of plungers mounted for reciprocation respectively in said two series of bores, and fluid-pressure operated means mounted in the casing and movable alternately in reverse directions parallel to said bores, said plungers being connected to said fluid-pressure operated means and the latter being operable, when moved in one direction or the other, to advance one series of plungers to discharge lubricant from the bores in which such one series of plungers is mounted, and simultaneously to retract the other series of plungers to introduce fresh lubricant into the bores in which said other series of plungers is mounted.

2. A lubricating device of the kind having a source of lubricant supply and lubricant distributing means, comprising a casing having a main inlet for connection to the source of lubricant supply and two series of outlets for connection to the points requiring lubrication, two series of bores in said casing communicating respectively with the two series of outlets, each bore having an inlet communicating with said main inlet, two series of plungers mounted for reciprocating in the respective series of bores, and fluid-pressure operable piston means mounted in the casing and movable alternately in reverse directions, said bores being arranged parallel to one another in a circle concentric with the axis of said piston means, and said plungers being connected to said piston means so that the latter, when moved in one direction or the other, advances one series of plungers to discharge lubricant from the bores in which such one series of plungers is mounted, and simultaneously retract the other series of plungers to introduce lubricant into the bores in which said other series of plungers is mounted.

3. A lubricating device as defined in claim 2, wherein said piston means comprises two coaxial fluid pressure operated pistons each reciprocable in the casing and to each of which one of the series of plungers is connected for movement therewith in both directions, said pistons being mechanically and rigidly interconnected in tandem and operable in response to a pressure differential on one or the other thereof to advace one series of plungers and simultaneously retract the other series of plungers.

4. A lubricating device as defined in claim 2, wherein the casing comprises two end parts in each of which one of said series of outlets is formed, and an intermediate part consisting of two concentric portions in the outer of which said main inlet is formed and in the inner of which portions of said part said bores are formed, said outer portion of the intermediate part being formed in its inner surface with a circumferential groove into which said main inlet opens, and said bores extending through said inner portion of the intermediate part parallel to the axis thereof and being arranged in a circle concentric therewith, and each of said bores having an inlet orifice communicating with said circumferential groove, said orifice of each bore being located intermediately of the ends thereof and at a point where it will be uncovered by the plunger in the respective bore while retracted to thereby permit entry of lubricant into said bore.

5. A lubricating device as defined in claim 4, wherein said bores extend from end to end of the inner portion of said intermediate part of the casing, the bores of each series discharging from the ends thereof opposite to the discharge ends of the other series of bores, and wherein each of said outlets consists of a passage extending from the inner end face of that part of the casing in which the outlet is formed to the exterior thereof, and the inner end of each outlet passage coincides and communicates with the discharge end of the respective bore when the end parts of the casing are assembled on the intermediate part thereof.

6. A lubricating device as defined in claim 5, including a non-return valve interposed between the discharge end of each bore and the inner end of the respective outlet passage communicating therewith to permit passage of lubricant from such bore into the outlet passage but prevent passage of lubricant in the reverse direction, said non-return valves being constructed in the form of flap valves disposed over the discharge ends of the bores in two circular series each of which series controls one of the series of bores and is formed in a thin metal annulus clamped between one of the end faces of the inner portion of said intermediate part and the inner face of the adjacent end part of the casing, each flap valve comprising a disc-shaped portion cut from the respective annulus and separated therefrom by an arcuate slot extending over the greater part of a circle and leaving the disc-shaped portion joined to the main body of the annulus by a neck portion, said neck portion having an inherent resilience which biasses the disc-shaped portion toward seated position against the adjacent end face of the inner portion of said intermediate part of the casing to cover the discharge end of the respective bore.

7. A lubricating device as defined in claim 3, wherein said plungers are formed with enlarged heads, and each of said pistons is formed on its inner side with a portion of reduced diameter which is flanged for engagement by the heads of the plungers operated by the respective pistons, thereby providing connections between the plungers and the respective pistons.

8. A lubricating device as defined in claim 2, wherein the casing is formed with coaxial cylinders, and the means for operating the plungers comprises a fluid-pressure operated piston reciprocable in one of said cylinders and to which one of the series of plungers is connected for movement therewith in both directions, and a circular plate member reciprocable within another of said cylinders and to which the other series of plungers is connected for movement therewith in both directions, said piston and plate member being mechanically and rigidly interconnected to operate in tandem and being movable in one direction by the application of a fluid-pressure differential to said piston to advance one series of plungers and simultaneously retract the other series thereof, and including spring means for moving the piston and plate member in the other direction in response to release of the piston from said fluid-pressure differential to effect movement of the plungers in the reverse direction.

9. A lubricating device as defined in claim 8, wherein said plungers are formed with enlarged heads, and said piston and plate member are each formed on their inner sides with a portion of reduced diameter which is flanged for engagement by the heads of the corresponding series of plungers, said engagement providing connections between the one series of plungers and the piston and between the other series of plungers and the plate member.

References Cited in the file of this patent

UNITED STATES PATENTS

| | | |
|---|---|---|
| 648,669 | McCanna | May 1, 1900 |
| 1,185,713 | Rice | June 6, 1916 |
| 1,868,800 | Kreidel | July 26, 1932 |
| 1,931,894 | Gill | Oct. 24, 1933 |

FOREIGN PATENTS

| | | |
|---|---|---|
| 626,093 | Great Britain | July 8, 1949 |